(12) United States Patent
Nishizawa et al.

(10) Patent No.: US 11,181,371 B2
(45) Date of Patent: Nov. 23, 2021

(54) VIBRATOR DEVICE, ELECTRONIC APPARATUS, AND VEHICLE

(71) Applicant: Seiko Epson Corporation, Tokyo (JP)

(72) Inventors: Ryuta Nishizawa, Nagano (JP); Shiro Murakami, Shiojiri (JP); Keiichi Yamaguchi, Ina (JP)

(73) Assignee: Seiko Epson Corporation

( * ) Notice: Subject to any disclaimer, the term of this patent is extended or adjusted under 35 U.S.C. 154(b) by 74 days.

(21) Appl. No.: 16/813,807

(22) Filed: Mar. 10, 2020

(65) Prior Publication Data

US 2020/0292314 A1    Sep. 17, 2020

(30) Foreign Application Priority Data

Mar. 11, 2019 (JP) .............................. JP2019-044146

(51) Int. Cl.
*G01C 19/5733* (2012.01)
(52) U.S. Cl.
CPC ................................ *G01C 19/5733* (2013.01)
(58) Field of Classification Search
CPC ............ G01C 19/5733; G01C 19/5656; G01C 19/5663; G01C 19/5783; H03B 5/32; H01L 23/12
See application file for complete search history.

(56) References Cited

U.S. PATENT DOCUMENTS

| | | | |
|---|---|---|---|
| 2005/0284223 A1 | 12/2005 | Karaki et al. | |
| 2013/0307094 A1* | 11/2013 | Yoshiuchi | G01P 1/023 257/415 |
| 2018/0274922 A1 | 9/2018 | Nishizawa et al. | |
| 2019/0165759 A1 | 5/2019 | Nishizawa et al. | |

FOREIGN PATENT DOCUMENTS

| | | |
|---|---|---|
| JP | 2004-096163 A | 3/2004 |
| JP | 2005-062160 A | 3/2005 |
| JP | 2009-302701 A | 12/2009 |
| JP | 2014-089049 A | 5/2014 |
| JP | 2016-176763 A | 10/2016 |
| JP | 2018-159674 A | 10/2018 |
| JP | 2019-102858 A | 6/2019 |

* cited by examiner

*Primary Examiner* — Xin Y Zhong
(74) *Attorney, Agent, or Firm* — Harness, Dickey & Pierce, P.L.C.

(57) ABSTRACT

A vibrator device includes a base, a relay substrate supported by the base, and a vibrating element supported by the relay substrate, the relay substrate includes a base mount that is directly or indirectly fixed to the base, a vibrating element mount on which the vibrating element is mounted, and a beam that couples the base mount and the vibrating element mount, and parts of the vibrating element mount that are coupled to the vibrating element are positioned on both sides of the base mount while interposing the base mount therebetween in a plan view.

13 Claims, 13 Drawing Sheets

VIBRATOR DEVICE, ELECTRONIC APPARATUS, AND VEHICLE

The present application is based on, and claims priority from, JP Application Serial Number 2019-044146, filed Mar. 11, 2019, the disclosure of which is hereby incorporated by reference herein in its entirety.

BACKGROUND

1. Technical Field

The present disclosure relates to a vibrator device, an electronic apparatus, and a vehicle.

2. Related Art

A vibrator device described in JP-A-2018-159674 includes a package, and a vibrating element and a relay substrate which are accommodated in the package. Further, the vibrating element is fixed to the package via the relay substrate. In addition, the relay substrate includes a vibrating element mount for mounting the vibrating element, a base mount that is positioned outside the vibrating element mount and is fixed to the package, and a beam that couples the base mount and the vibrating element mount.

In such a vibrator device, since the beam and the base mount of the relay substrate are positioned to protrude outside the vibrating element in a plan view, the size of the package increases accordingly. On the contrary, when a small package is used, it is necessary to make the vibrating element small by the amount corresponding to the beam and the base mount.

SUMMARY

A vibrator device according to an aspect of the present disclosure includes: a base; a relay substrate supported by the base; and a vibrating element supported by the relay substrate, in which the relay substrate includes a base mount that is directly or indirectly fixed to the base, a vibrating element mount on which the vibrating element is mounted, and a beam that couples the base mount and the vibrating element mount, and in which parts of the vibrating element mount that are coupled to the vibrating element are positioned on both sides of the base mount while interposing the base mount therebetween in a plan view.

The vibrator device may further include a circuit element supported by the base and electrically coupled to the vibrating element.

In the vibrator device, the relay substrate may be supported by the base via the circuit element.

In the vibrator device, the base may include a first recess and a second recess that is open to a bottom surface of the first recess, the circuit element may be supported on the bottom surface of the first recess, the relay substrate and the vibrating element may be positioned between the circuit element and a bottom surface of the second recess, and the circuit element may be coupled to the bottom surface of the first recess and coupled to the relay substrate on a surface of the circuit element on the bottom surface side of the second recess.

In the vibrator device, the circuit element may be coupled to the bottom surface of the first recess at an outer periphery of the surface of the circuit element at the bottom surface side of the second recess, and may be coupled to the relay substrate at a middle of the surface of the circuit element at the bottom surface side of the second recess.

In the vibrator device, the relay substrate may be positioned between the circuit element and the vibrating element.

In the vibrator device, the circuit element may have a first surface and a second surface that are in a front-rear relationship, the first surface may be coupled to the base, and the second surface may be coupled to the relay substrate.

In the vibrator device, in a plan view of the relay substrate, the relay substrate may be coupled to the circuit element in a region of the base mount that does not overlap the vibrating element.

In the vibrator device, the base may include a first recess and a second recess that is open to a bottom surface of the first recess, the circuit element may be coupled to the bottom surface of the first recess, and the relay substrate may be coupled to a bottom surface of the second recess.

In the vibrator device, the relay substrate may be formed of a material which is the same as that of the vibrating element.

In the vibrator device, in a plan view of the relay substrate, the beam may be positioned between the vibrating element mount and the base mount and may include a frame that has a frame shape surrounding the vibrating element mount, a first beam that couples the base mount and the frame, and a second beam that couples the vibrating element mount and the frame, and a direction along a central axis of the first beam and a direction along a central axis of the second beam may intersect each other.

An electronic apparatus according to another aspect of the present disclosure includes: the above-described vibrator device; and a signal processing circuit that performs signal processing based on an output signal of the vibrator device.

A vehicle according to another aspect of the present disclosure includes: the above-described vibrator device; and a signal processing circuit that performs signal processing based on an output signal of the vibrator device.

DESCRIPTION OF EXEMPLARY EMBODIMENTS

Hereinafter, a vibrator device, an electronic apparatus, and a vehicle of the application example will be described in detail based on embodiments illustrated in the attached drawings.

First Embodiment

Figure 1:
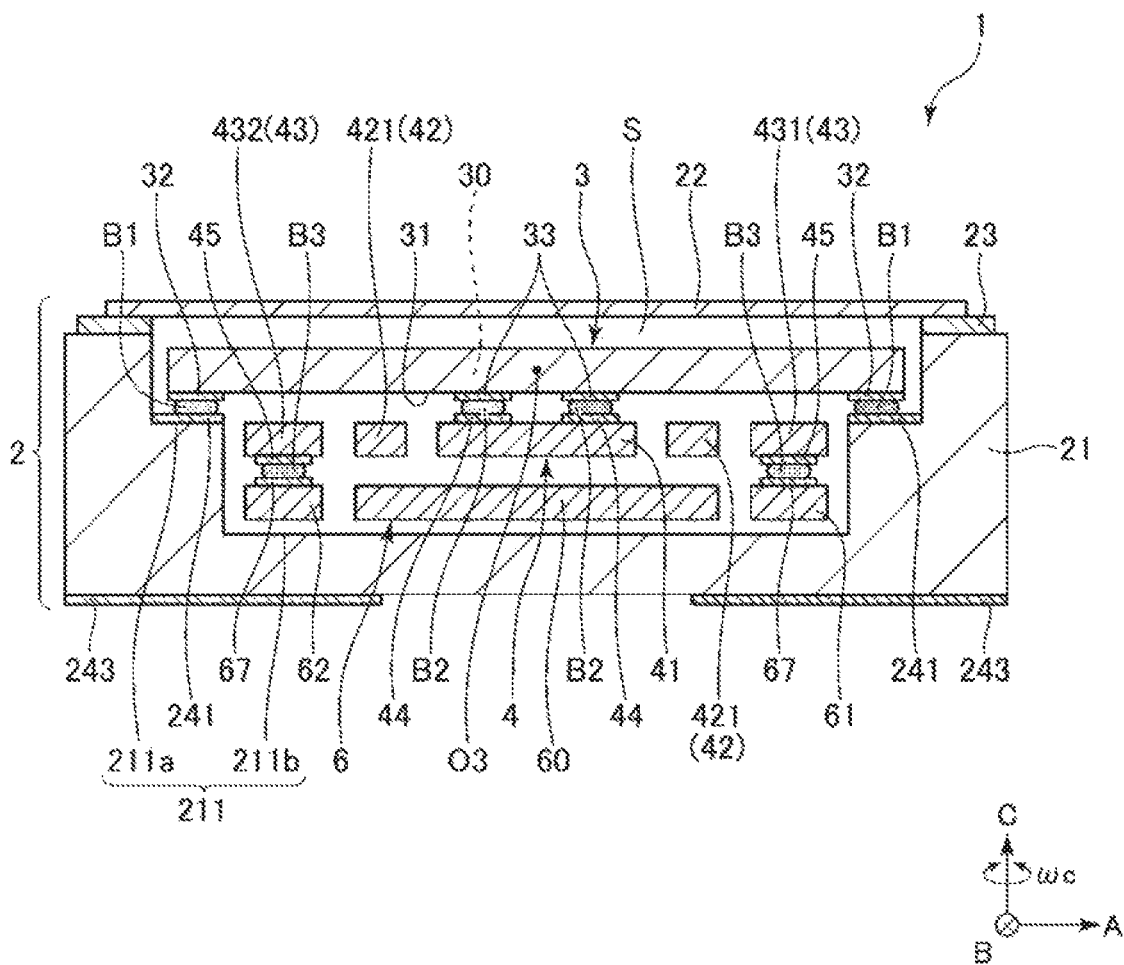
FIG. 1 is a sectional view illustrating a vibrator device according to a first embodiment.
Figure 2:
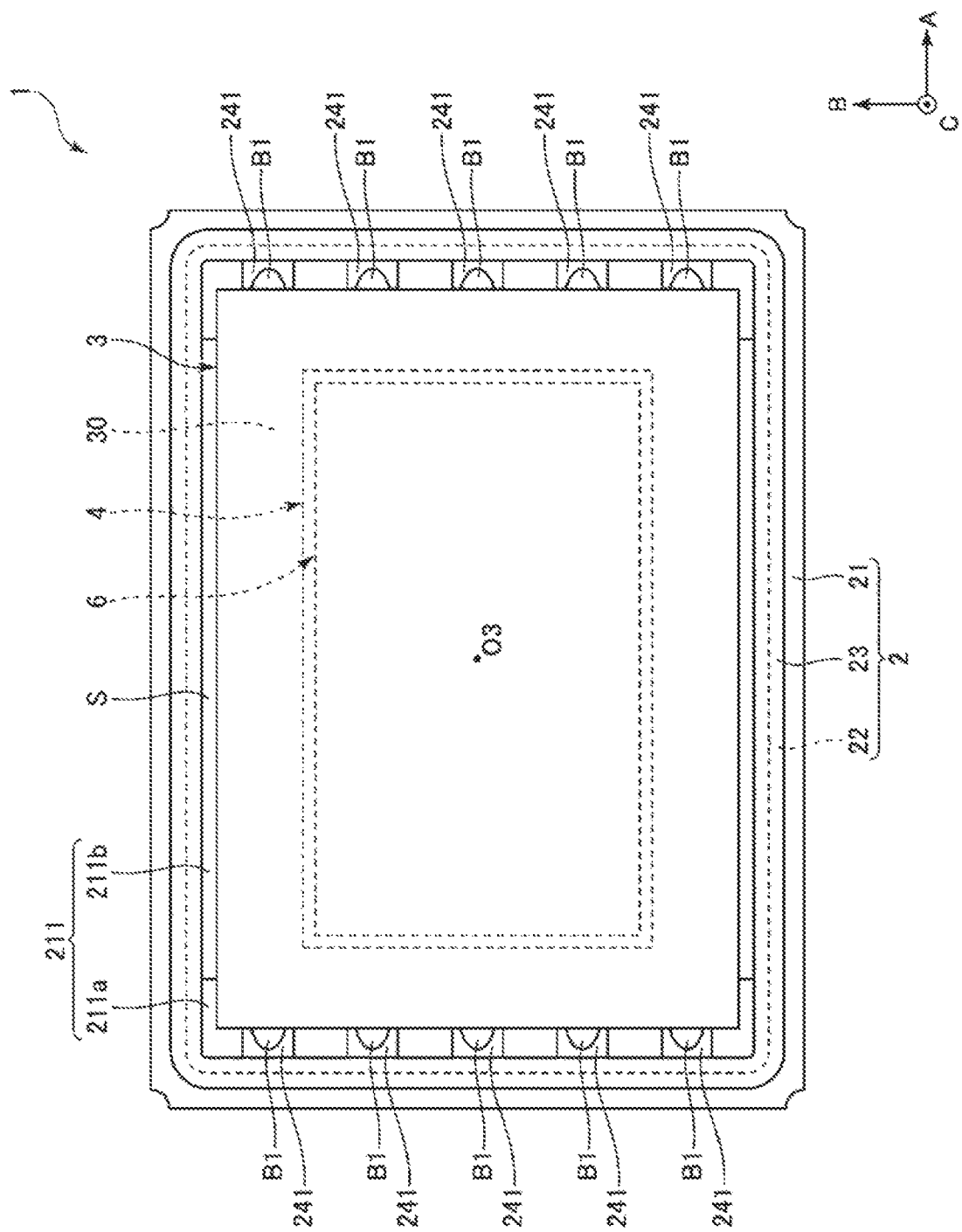
FIG. 2 is a plan view illustrating the vibrator device according to FIG. 1.
Figure 3:
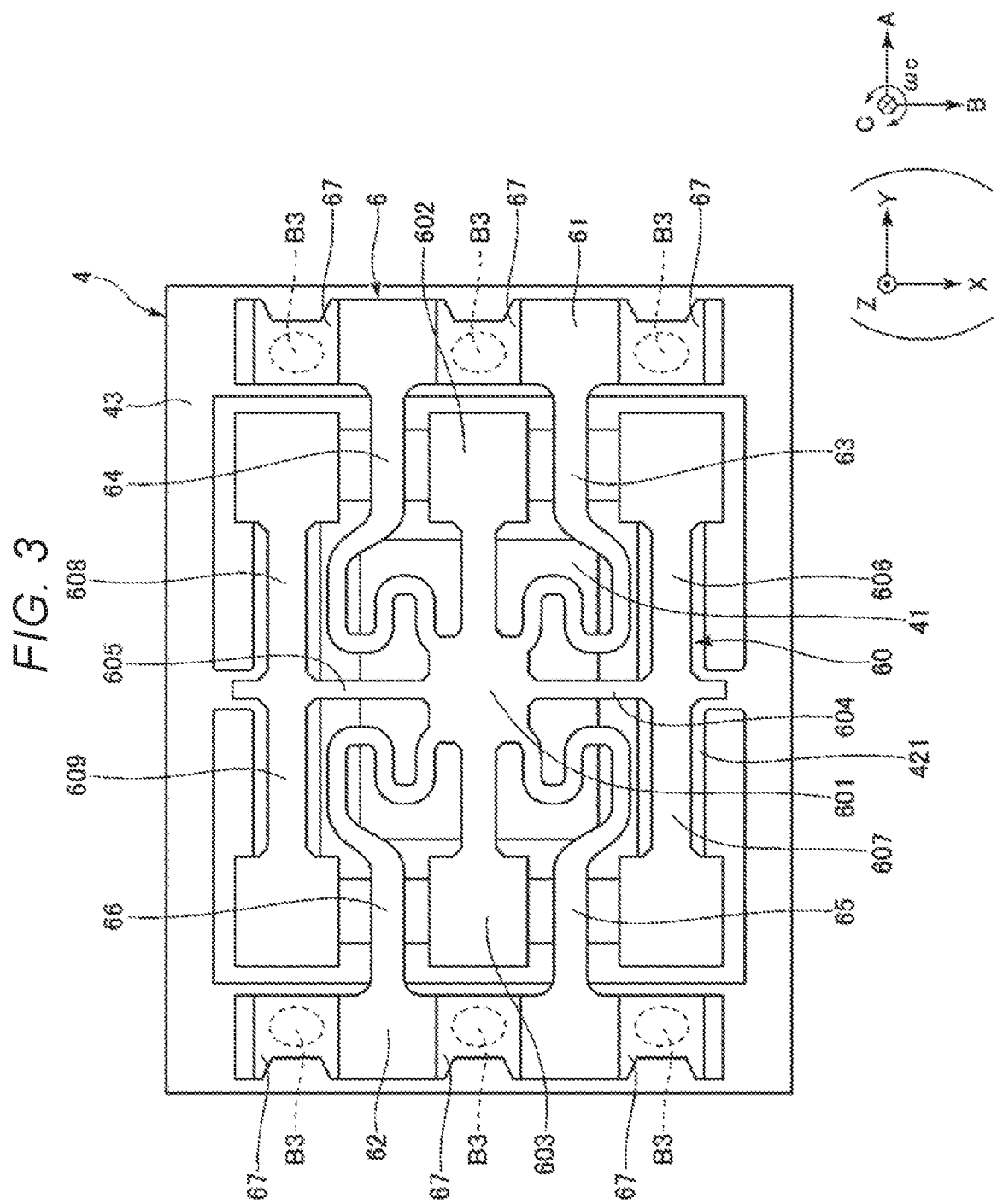
FIG. 3 is a plan view illustrating a vibrating element included in the vibrator device according to FIG. 1 when viewed from below.
Figure 4:
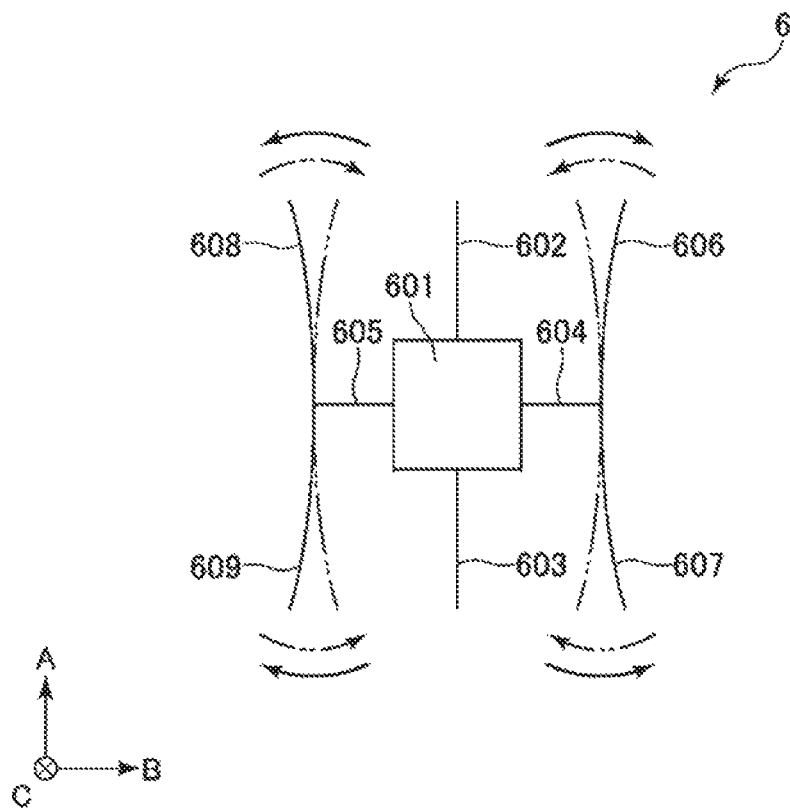
FIG. 4 is a schematic view for describing driving of the vibrating element according to FIG. 3.
Figure 5:
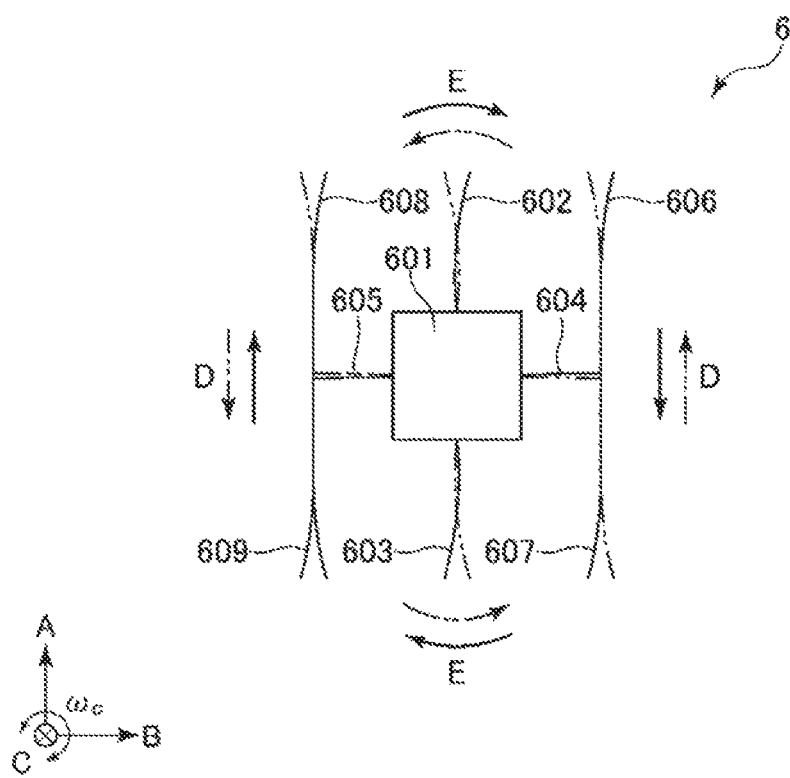
FIG. 5 is a schematic view for describing driving of the vibrating element according to FIG. 3.
Figure 6:
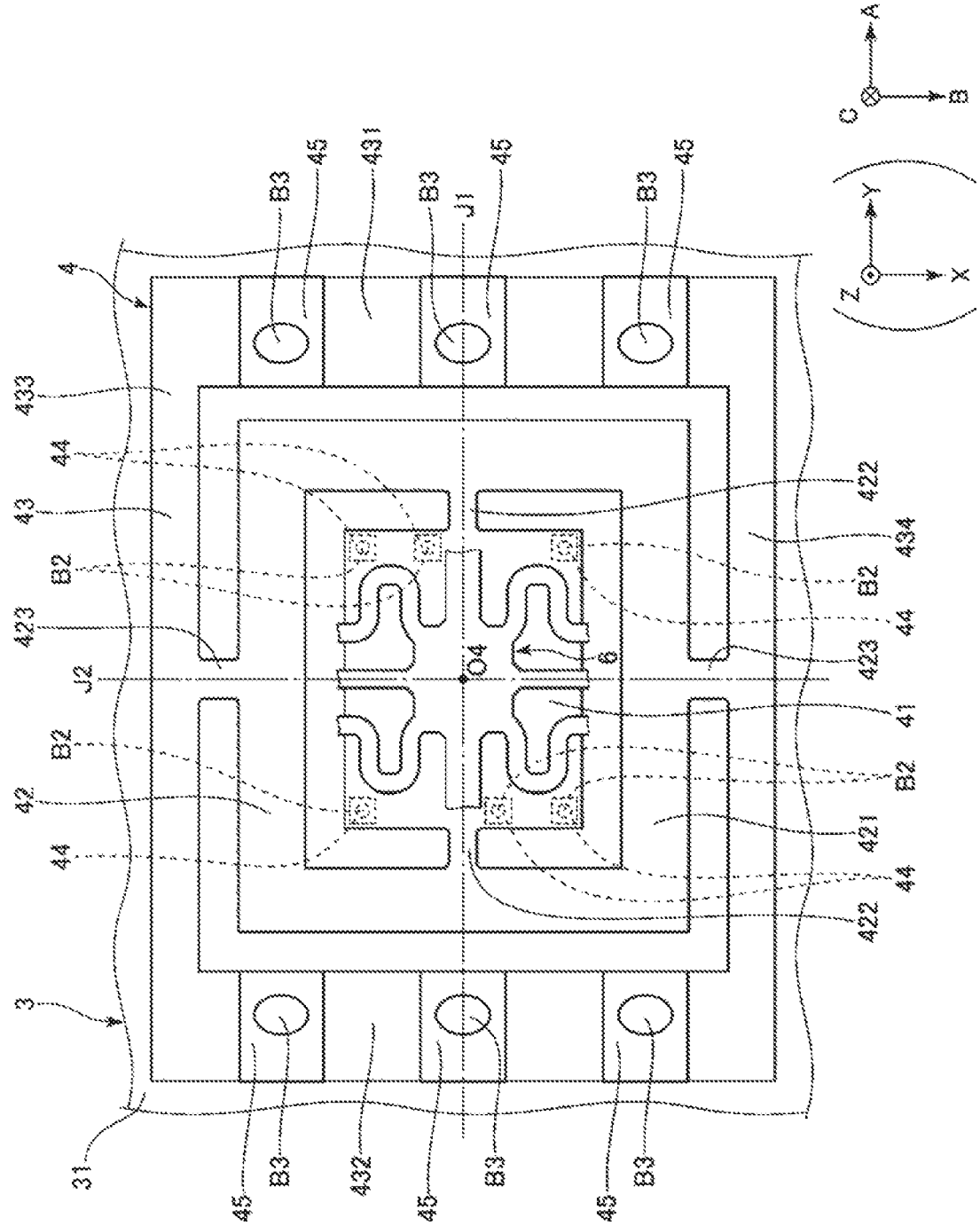
FIG. 6 is a plan view illustrating a relay substrate included in the vibrator device according to FIG. 1 when viewed from below.
Figure 7:
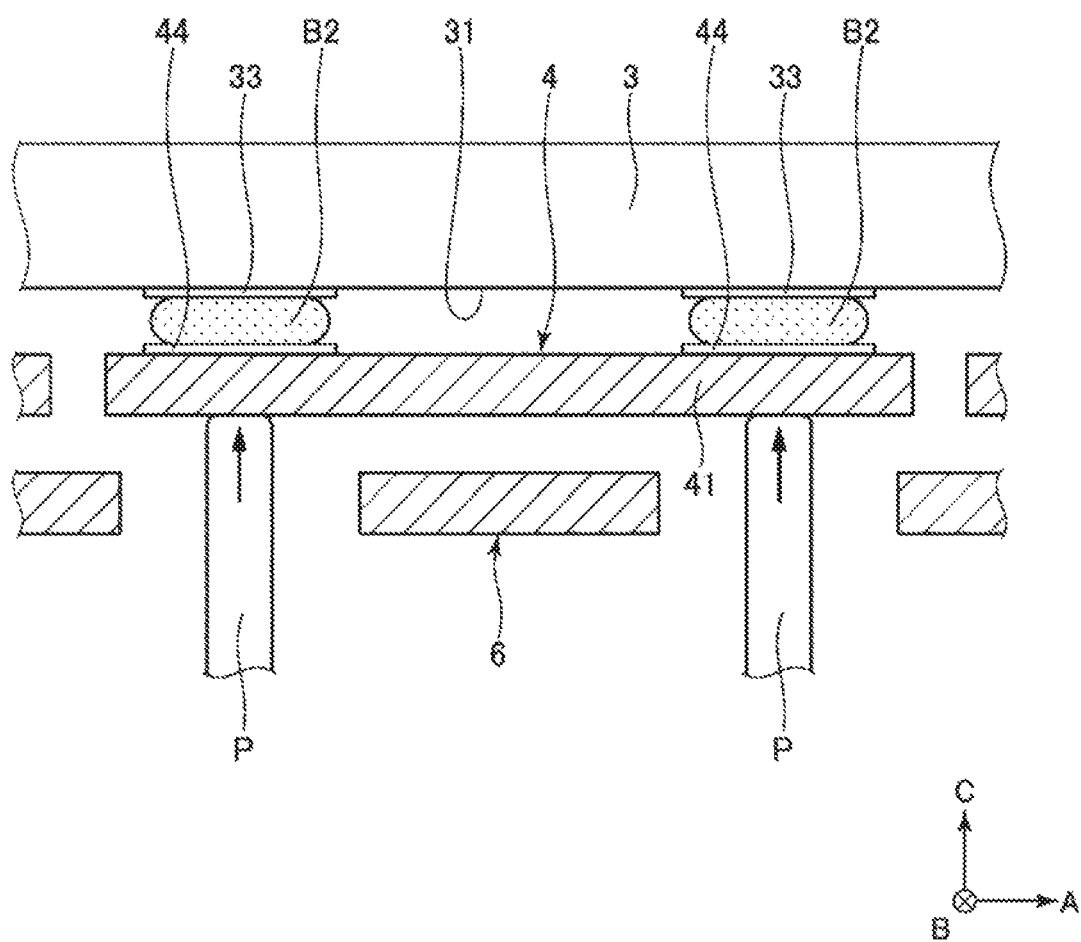
FIG. 7 is a schematic view illustrating a method for coupling the relay substrate to a circuit element.
Figure 8:
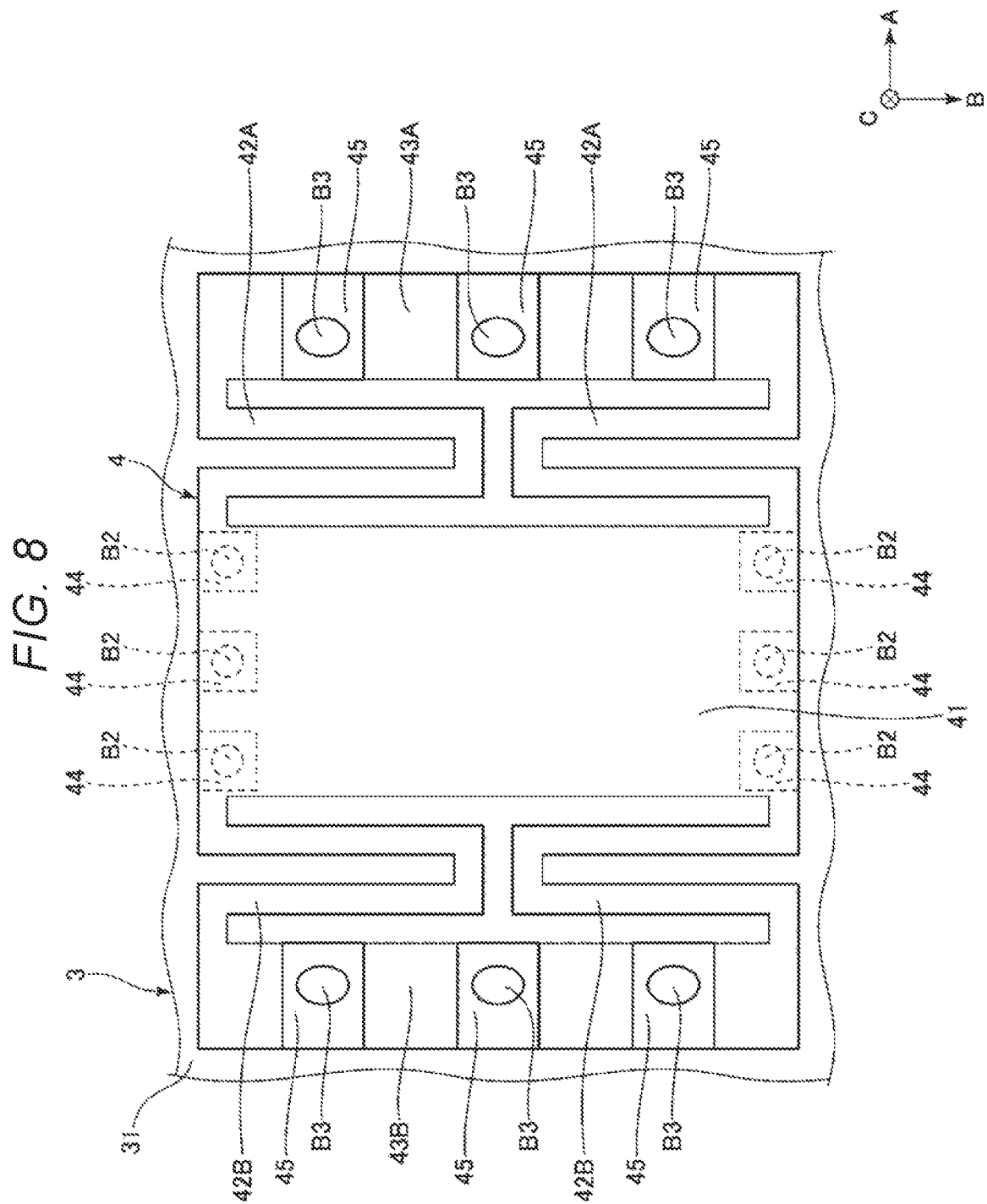
FIG. 8 is a plan view of a modification example of the relay substrate when viewed from below.

FIG. 1 is a sectional view illustrating the vibrator device according to a first embodiment. FIG. 2 is a plan view illustrating the vibrator device according to FIG. 1. FIG. 3 is a plan view illustrating a vibrating element included in the vibrator device according to FIG. 1 when viewed from below. FIGS. 4 and 5 are schematic views for describing driving of the vibrating element according to FIG. 3. FIG. 6 is a plan view illustrating a relay substrate included in the vibrator device according to FIG. 1 when viewed from below. FIG. 7 is a schematic view illustrating a method for coupling the relay substrate to a circuit element. FIG. 8 is a plan view of a modification example of the relay substrate when viewed from below. For convenience of description, each drawing illustrates an A axis, a B axis, and a C axis that are three axes orthogonal to each other. In the following, the arrow tip end side of each axis is also referred to as "positive side", and the opposite side is also referred to as "negative side". Further, the positive side in a direction along the C axis direction is also referred to as "upper", and the negative side is also referred to as "lower". In addition, the plan view from a direction along the C axis direction is also simply referred to as "plan view".

A vibrator device 1 illustrated in FIG. 1 is a physical quantity sensor that detects an angular velocity ωc around the C axis. By using the vibrator device 1 as a physical quantity sensor, the vibrator device 1 can be mounted on a wide range of electronic apparatuses, and the vibrator device 1 having high convenience is achieved. The vibrator device 1 includes a package 2, and a circuit element 3, a relay substrate 4, and a vibrating element 6 which are accommodated in the package 2.

The package 2 includes a base 21 having a recess 211 that is open to the upper surface, and a lid 22 joined to the upper surface of the base 21 via a joining member 23 so as to close an opening of the recess 211. An internal space S is formed on the inner side of the package 2 by the recess 211, and the circuit element 3, the relay substrate 4, and the vibrating element 6 are accommodated in the internal space S. The base 21 can be formed of ceramics, such as alumina, and the lid 22 can be formed of a metal material, such as Kovar. However, the configuration materials of the base 21 and the lid 22 are not particularly limited.

The accommodation space S is airtight and is in a depressurized state, preferably, a state of being closer to a vacuum. Accordingly, the vibration characteristics of the vibrating element 6 are improved. However, the atmosphere of the accommodation space S is not particularly limited, and may be, for example, an atmospheric pressure state or a pressurized state.

The recess 211 has a first recess 211a that is open to the upper surface of the base 21, and a second recess 211b that is open to the bottom surface of the first recess 211a and has a smaller opening width than the first recess 211a. The circuit element 3 is coupled to the bottom surface of the first recess 211a via a conductive joining member B1, the relay substrate 4 is coupled to the lower surface of the circuit element 3 via a conductive joining member B2, and the vibrating element 6 is coupled to the lower surface of the relay substrate 4 via a conductive joining member B3. In other words, the vibrating element 6 is coupled to the base 21 via the relay substrate 4 and the circuit element 3. In this manner, by interposing the circuit element 3 or the relay substrate 4, particularly the relay substrate 4, between the vibrating element 6 and the base 21, for example, a stress (hereinafter, also simply referred to as "stress from the package 2") caused by impact or thermal deflection of the package 2 becomes unlikely to be transmitted to the vibrating element 6, and the deterioration of the vibration characteristics of the vibrating element 6 can be suppressed.

The joining members B1, B2, and B3 are not particularly limited as long as the joining members have both conductivity and joining properties, and for example, various metal bumps, such as gold bumps, silver bumps, copper bumps, and solder bumps, or conductive adhesive in which a conductive filler, such as a silver filler, is dispersed in various adhesives, such as polyimide-based, epoxy-based, silicone-based, and acryl-based adhesives, can be used. When the former metal bumps are used as the joining members B1, B2, and B3, generation of gas from the joining members B1, B2, and B3 can be suppressed, and the environmental change of the internal space S, particularly, an increase in pressure, can be effectively suppressed. Meanwhile, when the latter conductive adhesive is used as the joining members B1, B2, and B3, the joining members B1, B2, and B3 become relatively soft, and the stress from the package 2 can also be absorbed and alleviated in the joining members B1, B2, and B3.

In addition, as illustrated in FIG. 2, in the internal space S, the vibrating element 6, the relay substrate 4, and the circuit element 3 overlap each other in a plan view. In other words, the vibrating element 6, the relay substrate 4, and the circuit element 3 are disposed side by side in the direction along the C axis. Accordingly, the spread of the package 2 in the direction along the A axis and the direction along the B axis can be suppressed, and the size of the vibrator device 1 can be reduced. As illustrated in FIG. 1, the relay substrate 4 and the vibrating element 6 are positioned below the circuit element 3, that is, between the circuit element 3 and the bottom surface of the second recess 211b. Accordingly, the second recess 211b can be effectively used as a space for disposing the relay substrate 4 and the vibrating element 6, and the package 2 can be reduced in size.

In addition, in a side view of the package 2, the relay substrate 4 is positioned between the vibrating element 6 and the circuit element 3 and supported in a state of being suspended from the circuit element 3. In this manner, by disposing the relay substrate 4 between the vibrating element 6 and the circuit element 3, these members have a natural positional relationship, and these members can be suitably disposed. However, the vibrating element 6 is not limited thereto as long as the vibrating element 6 is coupled to the circuit element 3 via the relay substrate 4, and for example, the vibrating element 6 may be positioned between the circuit element 3 and the relay substrate 4 in a side view of the package 2, and the circuit element 3 may be positioned between the vibrating element 6 and the relay substrate.

As illustrated in FIG. 1, an internal terminal 241 is disposed on the bottom surface of the first recess 211a, and an external terminal 243 is disposed on the lower surface of the base 21. In addition, the internal terminal 241 and the external terminal 243 are electrically coupled via an internal wiring (not illustrated) formed in the base 21.

The circuit element 3 includes a drive/detection circuit 30 that is electrically coupled to the vibrating element 6, drives the vibrating element 6, and detects the angular velocity ωc based on a detection signal output from the vibrating element 6. In addition, the configuration of the circuit element 3 is not particularly limited, and may include other circuits, such as a temperature compensation circuit, for example. In the circuit element 3, the outer periphery of a lower surface 31 thereof is coupled to the bottom surface of the first recess 211a via the joining member B1, and the middle of the lower surface 31 is coupled to the relay substrate 4 via the joining member B2. In this manner, by dividing the coupling place into the outer periphery and the middle, the circuit element 3 can be coupled to the bottom surface of the first recess 211a without being obstructed by the relay substrate 4, and the relay substrate 4 can be coupled to the lower surface 31 of the circuit element 3 without obstructing the base 21.

In particular, the circuit element 3 is coupled to the bottom surface of the first recess 211a via the joining member B1 at the part positioned on the positive side in the direction along the A axis with respect to a center O3 of the circuit element 3, and is fixed to the bottom surface of the first recess 211a via the joining member B1 at the part positioned at the negative side in the direction along the A axis with respect to the center O3. In other words, the circuit element 3 is supported by the base 21 at both ends thereof. Accordingly, the posture of the circuit element 3 is stabilized.

In addition, the lower surface 31 of the circuit element 3 is an active surface, a plurality of terminals 32 are disposed at the outer periphery of the lower surface 31, and a plurality of terminals 33 are disposed at the middle. Each of the terminals 32 is electrically coupled to the internal terminal 241 via the joining member B1, and each of the terminals 33 is electrically coupled to a terminal 44 (will be described later) disposed on the relay substrate 4 via the joining member B2.

The vibrating element 6 is an angular velocity sensor element (physical quantity sensor element) that can detect the angular velocity ωc around the C axis. As illustrated in FIG. 3, the vibrating element 6 is formed from a Z cut quartz substrate, and includes an element main body 60, support portions 61 and 62 that support the element main body 60 on both sides thereof, a pair of beams 63 and 64 that couple the element main body 60 and the support portion 61, and a pair of beams 65 and 66 that couple the element main body 60 and the support portion 62. The Z cut quartz substrate has a width on an X-Y plane defined by the X axis (electrical axis) and the Y axis (mechanical axis) that are quartz crystals axes of the quartz crystals, and has a thickness in the direction along the Z axis (optical axis).

The element main body 60 includes a base portion 601 positioned at the central portion, detection arms 602 and 603 that extend from the base portion 601 toward both sides in the direction along the A axis, coupling arms 604 and 605 that extend from the base portion 601 toward both sides in the direction along the B axis, driving arms 606 and 607 that extend from the tip end portion of the coupling arm 604 toward both sides in the direction along the A axis, and driving arms 608 and 609 that extend from the tip end portion of the coupling arm 605 toward the both sides in the direction along the A axis.

Although not illustrated, drive electrodes are disposed on each of the driving arms 606 to 609, and detection electrodes are disposed on each of the detection arms 602 and 603. In addition, when a drive signal is applied to the drive electrode, the driving arms 606 to 609 vibrate in a drive vibration mode illustrated in FIG. 4. When the angular velocity ωc is applied to the vibrating element 6 in a state of driving in the drive vibration mode, a detection vibration mode illustrated in FIG. 5 is newly excited. In the detection vibration mode, Coriolis force acts on the driving arms 606 to 609 to excite vibrations in the direction indicated by the arrow D, and in response to the vibration, the detection arms 602 and 603 flexurally vibrate in the direction indicated by the arrow E. The charges generated in the detection arms 602 and 603 in such a detection vibration mode can be taken out from the detection electrodes as detection signals, and the angular velocity ωc can be detected based on the detection signals.

Further, as illustrated in FIG. 3, the support portion 61 is positioned on the positive side in the direction along the A axis of the element main body 60. The beam 63 couples the base portion 601 and the support portion 61 passing between the driving arm 606 and the detection arm 602, and the beam 64 couples the base portion 601 and the support portion 61 passing between the driving arm 608 and the detection arm 602. Further, the support portion 62 is positioned at the negative side in the direction along the A axis of the element main body 60. The beam 65 couples the base portion 601 and the support portion 62 passing between the driving arm 607 and the detection arm 603, and the beam 66 couples the base portion 601 and the support portion 62 passing between the driving arm 609 and the detection arm 603.

The beams 63 to 66 have bent portions meandering in an S shape in the middle of the beams, and have a shape that is easily elastically deformed in the direction along the A axis and in the direction along the B axis. As described above, the stress from the package 2 is absorbed and alleviated by the relay substrate 4, but even when a part of the stress is transmitted to the vibrating element 6 via the relay substrate 4, the stress can be effectively absorbed and alleviated by the beams 63 to 66. Therefore, the stress from the package 2 becomes more unlikely to be transmitted to the element main body 60. However, each shape of the beams 63 to 66 is not particularly limited. In addition, a plurality of terminals 67 that are electrically coupled to the drive electrodes or the detection electrodes described above are disposed on the support portions 61 and 62, respectively.

The configuration of the vibrating element 6 is not particularly limited. For example, the vibrating element 6 may be formed from each piezoelectric substrate, such as lithium niobate ($LiNbO_3$), lithium tantalate ($LiTaO_3$), lead zirconate titanate (PZT), lithium tetraborate ($Li_2B_4O_7$), langasite crystal ($La_3Ga_5SiO_{14}$), potassium niobate ($KNbO_3$), gallium phosphate ($GaPO_4$), gallium arsenide (GaAs), aluminum nitride (AlN), zinc oxide (ZnO, $Zn_2O_3$), barium titanate ($BaTiO_3$), lead titanate ($PbPO_3$), sodium potassium niobate ($(K, Na)NbO_3$), bismuth ferrite ($BiFeO_3$), sodium niobate ($NaNbO_3$), bismuth titanate ($Bi_4Ti_3O_{12}$), bismuth sodium titanate ($Na_{0.5}Bi_{0.5}TiO_3$), or the like, or may be formed from a substrate other than the piezoelectric substrate, such as a silicon substrate.

The vibrating element 6 may be an element that detects an angular velocity around the A axis or an element that detects an angular velocity around the B axis. Further, the angular velocity around two or more axes of the A axis, the B axis, and the C axis may be detected independently. The vibrating element 6 is not limited to a physical quantity sensor element, and may be a vibrating element used for an oscillator. In addition, a plurality of vibrating elements 6 may be mounted on the vibrating element mount 43.

The relay substrate 4 is interposed between the circuit element 3 and the vibrating element 6. The relay substrate 4 has a function of absorbing and alleviating the stress from the package 2 and making it difficult to transmit the stress to the vibrating element 6. As illustrated in FIG. 6, the relay substrate 4 has a gimbal shape, and includes a base mount 41 positioned at the middle and coupled to the circuit element 3 via the joining member B2, a vibrating element mount 43 that surrounds the base mount 41 and is coupled to the vibrating element 6 via the joining member B3, and a beam 42 that is positioned between the base mount 41 and the vibrating element mount 43 and couples the base mount 41 and the vibrating element mount 43.

The beam 42 includes a frame-shaped frame 421 that is positioned between the base mount 41 and the vibrating element mount 43 and surrounds the base mount 41, a first beam 422 that couples the base mount 41 and the frame 421, and a second beam 423 that couples the vibrating element mount 43 and the frame 421. The first beam 422 couples the base mount 41 and the frame 421 at the center in the direction along the B axis, and a central axis J1 is along the A axis. Meanwhile, the second beam 423 couples the vibrating element mount 43 and the frame 421 at the center in the direction along the A axis, and a central axis J2 is along the B axis. In other words, the central axes J1 and J2 are orthogonal to each other, and the intersection point thereof substantially matches a center O4 of the relay substrate 4. However, the central axes J1 and J2 may intersect at an angle of more than 0° and less than 90°, or these intersections may deviate from the center O4.

In this manner, by forming the relay substrate 4 in the gimbal shape, with a relatively simple configuration, the stress in the direction along the A axis and the stress in the direction along the B axis can be respectively effectively absorbed and alleviated. Therefore, the stress from the package 2 becomes unlikely to be transmitted by the vibrating element 6, and the vibration characteristics of the vibrating element 6 are further stabilized.

The vibrating element mount 43 has a rectangular frame shape, and corresponding to the four sides thereof, has the parts 431 and 432 that extend in the direction along the B axis, and the parts 433 and 434 that extend in the direction along the A axis. The vibrating element 6 is coupled to the parts 431 and 432 positioned at opposite sides with respect to the center 04. Specifically, in a plan view, the support portion 61 of the vibrating element 6 overlaps the part 431, the support portion 61 is fixed to the part 431 via the joining member B3, the support portion 62 of the vibrating element 6 overlaps the part 432, and the support portion 62 is fixed to the part 432 via the joining member B3.

In this manner, by disposing the parts 431 and 432 coupled to the vibrating element 6 at both sides in the direction along the A axis of the base mount 41 which is a part coupled to the circuit element 3, compared to a configuration in which the base mounts 41 are at both sides of the vibrating element mount 43 similar to the above-described technology of the related art, the size of the vibrating element 6 with respect to the relay substrate 4 can increase. Therefore, the size of the vibrating element 6 can increase without causing an increase in size of the package 2, and the vibration characteristics of the vibrating element 6 are improved as much as the size increases. Furthermore, the vibrating element 6 is supported from both sides, and the posture of the vibrating element 6 is stabilized.

In addition, the plurality of terminals 44 are disposed on the upper surfaces of the base mount 41, and a plurality of terminals 45 are disposed on the lower surfaces of the parts 431 and 432 of the vibrating element mount 43. Further, the terminals 44 and 45 are electrically coupled via a wiring (not illustrated) disposed on the relay substrate 4. In addition, the plurality of terminals 45 are electrically coupled to the terminals 67 of the vibrating element 6 via the joining member B3, and the plurality of terminals 44 are electrically coupled to the terminals 33 of the circuit element 3 via the joining member B2. Accordingly, the vibrating element 6 and the circuit element 3 are electrically coupled via the relay substrate 4.

Further, as illustrated in FIG. 6, each of the joining members B2 that couples the base mount 41 and the circuit element 3 does not overlap the vibrating element 6 in a plan view. In other words, the relay substrate 4 is coupled to the circuit element 3 in a region of the base mount 41 that does not overlap the vibrating element 6 in a plan view. Accordingly, the coupling between the relay substrate 4 and the circuit element 3 becomes easy. Specifically, since the relay substrate 4 is coupled to the circuit element 3 in a state where the vibrating element 6 is fixed to the vibrating element mount 43, when the joining member B2 does not overlap the vibrating element 6 in a plan view, as illustrated in FIG. 7, a pin P can be inserted from the periphery of the vibrating element 6, and a part of the pin P that overlaps the joining member B2 of the base mount 41 can be pressed toward the circuit element 3. Therefore, the base mount 41 can be pressed to the joining member B2 with a predetermined strength without excess or deficiency. As a result, the joining between the relay substrate 4 and the circuit element 3 can be more reliably and accurately performed. However, not being limited thereto, and at least a part of the plurality of joining members B2 may overlap the vibrating element 6 in a plan view.

The relay substrate 4 is formed of quartz crystals. By forming the relay substrate 4 from the quartz crystals in the same manner as the vibrating element 6, the thermal expansion coefficients of the relay substrate 4 and the vibrating element 6 can be made equal. Therefore, the thermal stress caused by the difference in thermal expansion coefficient between the relay substrate 4 and the vibrating element 6 does not substantially occur, and the vibrating element 6 becomes unlikely to receive the stress. Therefore, it is possible to more effectively suppress the deterioration or fluctuation of the vibration characteristics of the vibrating element 6.

In particular, the relay substrate 4 is formed from the quartz substrate having the same cut angle as the vibrating element 6. As described above, since the vibrating element 6 is formed from the Z cut quartz substrate, the relay substrate 4 is also formed from the Z cut quartz substrate. Furthermore, the orientation of the quartz crystals axis of the relay substrate 4 matches the orientation of the quartz crystals axis of the vibrating element 6. In other words, the relay substrate 4 and the vibrating element 6 have the same direction along the X axis, the same direction along the Y axis, and the same direction along the Z axis. Since the quartz crystals have different thermal expansion coefficients in each of the direction along the X axis, the direction along the Y axis, and the direction along the Z axis, the relay substrate 4 and the vibrating element 6 have the same cut angle, and by aligning the orientations of the quartz crystals axes with each other, the above-described thermal stress becomes unlikely to occur between the relay substrate 4 and the vibrating element 6. Therefore, the vibrating element 6 becomes unlikely to receive stress, and the deterioration or fluctuation of the vibration characteristics can be further effectively suppressed.

The relay substrate 4 is not limited thereto, and for example, the relay substrate 4 has the same cut angle as the vibrating element 6, but the direction along the quartz crystals axis may be different from that of the vibrating element 6. Further, the relay substrate 4 may be formed from a quartz substrate having a cut angle different from that of the vibrating element 6. Further, the configuration material of the relay substrate 4 may not be quartz crystals. Further, the configuration material of the relay substrate 4 may be different from the configuration material of the vibrating element 6.

In addition, as the relay substrate 4, for example, a configuration illustrated in FIG. 8 may be employed. The relay substrate 4 illustrated in FIG. 8 includes the base mount 41, a vibrating element mount 43A positioned on the positive side in the direction along the A axis of the base mount 41, a vibrating element mount 43B positioned at the negative side in the direction along the A axis of the base mount 41, a pair of beams 42A that is positioned between the base mount 41 and the vibrating element mount 43A and couples the base mount 41 and the vibrating element mount 43A, and a pair of beams 42B that is positioned between the base mount 41 and the vibrating element mount 43B and couples the base mount 41 and the vibrating element mount 43B. The base mount 41 is coupled to the circuit element 3, and the vibrating element mounts 43A and 43B are coupled to the vibrating element 6.

Above, the vibrator device 1 has been described. As described above, the vibrator device 1 includes the base 21, the relay substrate 4 supported by the base 21, and the vibrating element 6 supported by the relay substrate 4. In addition, the relay substrate 4 includes the base mount 41 indirectly fixed to the base 21 via the circuit element 3, the vibrating element mount 43 on which the vibrating element 6 is mounted, the beam 42 that couples the base mount 41 and the vibrating element mount 43. The parts coupled to the vibrating element 6 of the vibrating element mount 43, that is, the parts 431 and 432 are positioned on both sides of the base mount 41 with the base mount 41 interposed therebetween in a plan view. In this manner, by disposing the vibrating element mount 43 which is the part coupled to the vibrating element 6 at both sides of the base mount 41, that is, the part coupled to the circuit element 3, compared to a configuration in which the base mounts 41 are at both sides of the vibrating element mount 43 similar to the above-described technology of the related art, the size of the vibrating element 6 with respect to the relay substrate 4 can increase. Therefore, the size of the vibrating element 6 can increase without causing an increase in size of the package 2, and the vibration characteristics of the vibrating element 6 are improved as much as the size increases. In addition, "indirectly fixed" means being fixed via some type of inclusion, and in the embodiment, the circuit element 3 is an inclusion.

Further, as described above, the vibrator device 1 includes the circuit element 3 supported by the base 21 and electrically coupled to the vibrating element 6. Accordingly, the circuit element 3 and the vibrating element 6 can be disposed close to each other, and noise mixed in the signal output from the vibrating element 6, that is, the detection signal of the angular velocity $\omega c$ in the embodiment, can be reduced. Therefore, the angular velocity $\omega c$ can be detected with higher accuracy.

Further, as described above, the relay substrate 4 is supported by the base 21 via the circuit element 3. Accordingly, the stress from the package 2 becomes unlikely to be transmitted by the vibrating element 6. Therefore, it is possible to more effectively suppress the deterioration and fluctuation of the vibration characteristics of the vibrating element 6.

Further, as described above, the base 21 includes the first recess 211a and the second recess 211b that is open to the bottom surface of the first recess 211a. The circuit element 3 is supported by the bottom surface of the first recess 211a, and the relay substrate 4 and the vibrating element 6 are positioned between the circuit element 3 and the bottom surface of the second recess 211b. On the surface of the circuit element 3 at the bottom surface side of the second recess 211b, that is, the lower surface 31, the circuit element 3 is coupled to the bottom surface of the first recess 211a and is coupled to the relay substrate 4. As described above, since the lower surface of the circuit element 3 is an active surface, the terminals 32 and 33 are easily disposed. Therefore, as the lower surface is coupled to the bottom surface of the first recess 211a and is coupled to the relay substrate 4, the electric joining between the circuit element 3 and the internal terminal 241 and the electric joining between the circuit element 3 and the relay substrate 4 become easy.

As described above, the circuit element 3 is coupled to the bottom surface of the first recess 211a at the outer periphery of the lower surface 31, and is coupled to the relay substrate 4 at the middle of the lower surface 31. Accordingly, the circuit element 3 can be coupled to the bottom surface of the first recess 211a without being obstructed by the relay substrate 4, and the relay substrate 4 can be coupled to the lower surface 31 of the circuit element 3 without being obstructed by the base 21.

Further, as described above, the relay substrate 4 is positioned between the circuit element 3 and the vibrating element 6. Accordingly, these members have a natural positional relationship and these members can be suitably disposed.

Further, as described above, in a plan view of the relay substrate 4, the relay substrate 4 is coupled to the circuit element 3 in a region of the base mount 41 that does not overlap the vibrating element 6. Accordingly, the coupling between the relay substrate 4 and the circuit element 3 becomes easy.

Further, as described above, the relay substrate 4 is formed of the same material as that of the vibrating element 6 and is formed of quartz crystals in the embodiment. Accordingly, the thermal expansion coefficients of the relay substrate 4 and the vibrating element 6 can be made equal. Therefore, the thermal stress caused by the difference in thermal expansion coefficient between the relay substrate 4 and the vibrating element 6 does not substantially occur, and the vibrating element 6 becomes unlikely to receive the stress. Therefore, it is possible to more effectively suppress the deterioration or fluctuation of the vibration characteristics of the vibrating element 6.

Further, as described above, in a plan view of the relay substrate 4, the beam 42 is positioned between the vibrating element mount 43 and the base mount 41, and includes the frame 421 that forms a frame shape surrounding the vibrating element mount 43, the first beam 422 that couples the base mount 41 and the frame 421, and the second beam 423 that couples the vibrating element mount 43 and the frame 421. The direction along the central axis J1 of the first beam 422 and the direction along the central axis J2 of the second beam 423 intersect each other. Accordingly, with a relatively simple configuration, the stress in the direction along the A axis and the stress in the direction along the B axis can be respectively effectively absorbed and alleviated. Therefore, the stress from the package 2 becomes more unlikely to be transmitted to the vibrating element 6, and the vibration characteristics of the vibrating element 6 are further stabilized.

Second Embodiment

Figure 9:
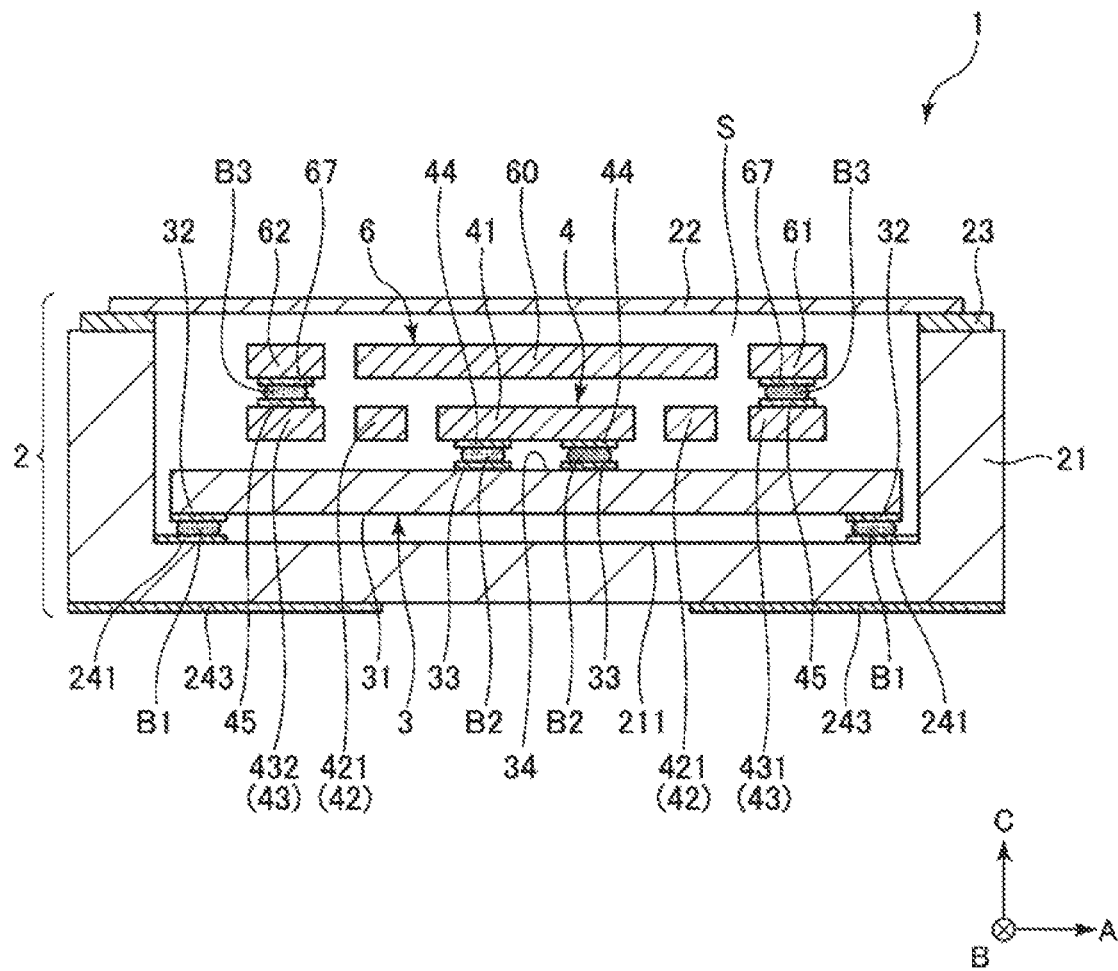
FIG. 9 is a sectional view illustrating a vibrator device according to a second embodiment.

FIG. 9 is a sectional view illustrating the vibrator device according to a second embodiment.

The embodiment is the same as the above-described first embodiment except that the disposition of the circuit element 3, the relay substrate 4, and the vibrating element 6 in the package 2 is different. In the following description regarding the embodiment, the differences from the above-described embodiment will be mainly described, and the description of similar contents will be omitted. In addition, in FIG. 9, the same configurations will be given the same reference numerals as those in the above-described embodiment.

As illustrated in FIG. 9, in the vibrator device 1 of the embodiment, the lower surface 31 (first surface) of the circuit element 3 is an active surface, and the lower surface 31 is fixed to the bottom surface of the recess 211 via the plurality of joining members B1. The plurality of internal terminals 241 are disposed on the bottom surface of the recess 211, and the internal terminals 241 and the terminal 32 provided on the lower surface 31 are electrically coupled via the joining member B1. The relay substrate 4 is positioned on the upper side of the circuit element 3 and coupled to the upper surface 34 (second surface) of the circuit element 3 via the joining member B2. In addition, the plurality of terminals 33 are disposed on the upper surface 34, and the terminals 33 and the relay substrate 4 are electrically coupled via the joining member B2. Further, the vibrating element 6 is positioned on the upper side of the relay substrate 4 and is coupled to the upper surface of the vibrating element mount 43 of the relay substrate 4 via the joining member B3.

In this manner, the circuit element 3 has the lower surface 31 as the first surface and the upper surface 34 as the second surface that are in a front-rear relationship, the lower surface 31 is coupled to the base 21, and the upper surface 34 is coupled to the relay substrate 4. By adopting such a configuration, for example, compared to the above-described first embodiment, the degree of freedom of coupling between the circuit element 3 and the base 21 increases and the degree of freedom of coupling between the circuit element 3 and the relay substrate 4 increases.

According to the second embodiment as described above, the same configurations as those of the above-described first embodiment can be achieved.

Third Embodiment

Figure 10:
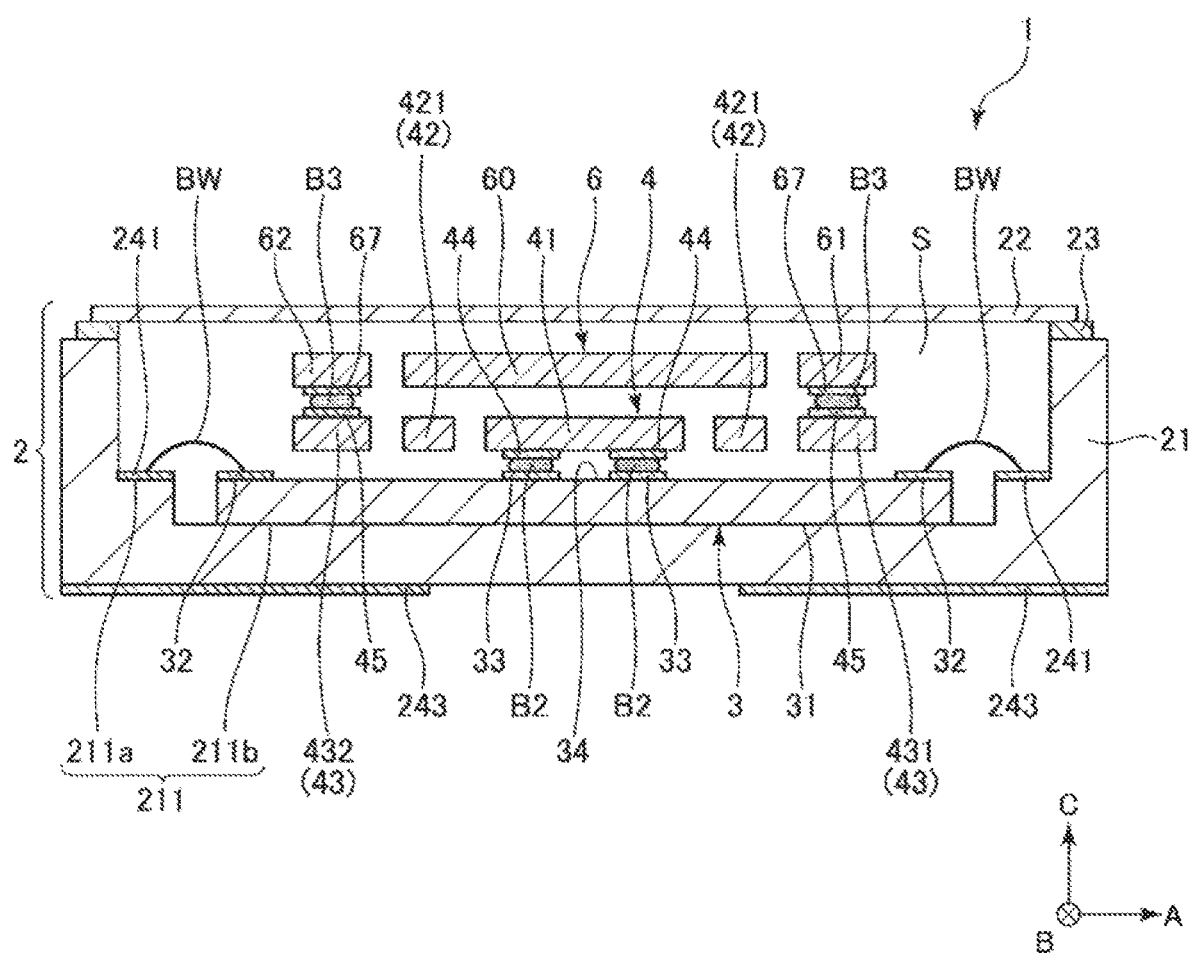
FIG. 10 is a sectional view illustrating a vibrator device according to a third embodiment.

FIG. 10 is a sectional view illustrating the vibrator device according to a third embodiment.

The embodiment is similar to the above-described second embodiment except for the orientation of the circuit element 3. In the following description regarding the embodiment, the differences from the above-described embodiment will be mainly described, and the description of similar contents will be omitted. In addition, in FIG. 10, the same configurations will be given the same reference numerals as those in the above-described embodiment.

As illustrated in FIG. 10, in the vibrator device 1 of the embodiment, the circuit element 3 is fixed to the bottom surface of the second recess 211b. In addition, the upper surface 34 of the circuit element 3 is an active surface, the plurality of terminals 32 are disposed at the outer periphery of the upper surface 34, and the plurality of terminals 33 are disposed at the middle. Further, each of the plurality of terminals 32 is coupled to the internal terminal 241 via a bonding wire BW.

According to the third embodiment as described above, the same configurations as those of the above-described first embodiment can be achieved.

Fourth Embodiment

Figure 11:
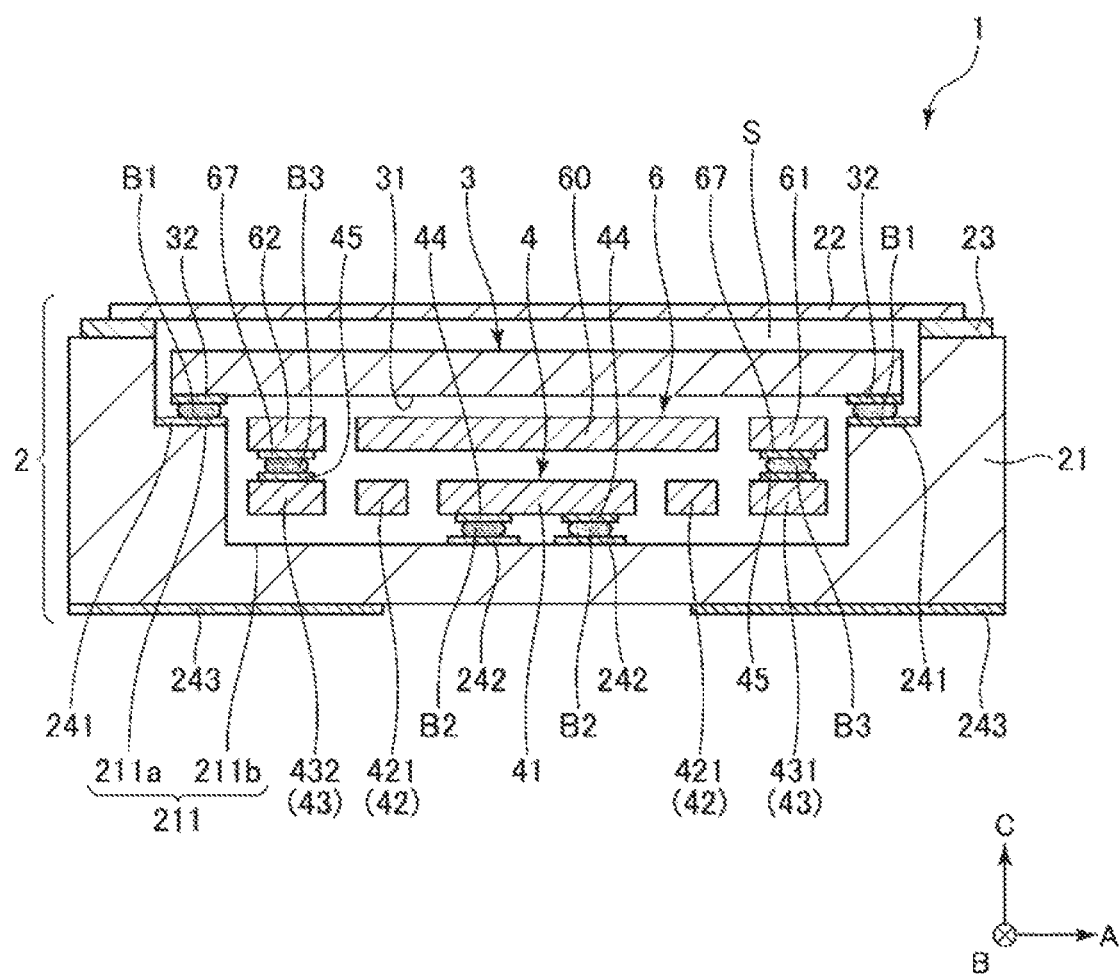
FIG. 11 is a sectional view illustrating a vibrator device according to a fourth embodiment.

FIG. 11 is a sectional view illustrating the vibrator device according to a fourth embodiment.

The embodiment is the same as the above-described first embodiment except that the disposition of the circuit element 3, the relay substrate 4, and the vibrating element 6 in the package 2 is different. In the following description regarding the embodiment, the differences from the above-described embodiment will be mainly described, and the description of similar contents will be omitted. In addition, in FIG. 11, the same configurations will be given the same reference numerals as those in the above-described embodiment.

As illustrated in FIG. 11, in the vibrator device 1 of the embodiment, the relay substrate 4 is directly coupled to the base 21 without interposing the circuit element 3 or other inclusions. Specifically, the relay substrate 4 is coupled to the bottom surface of the second recess 211b via the joining member B2. In addition, an internal terminal 242 electrically coupled to the internal terminal 241 via the internal wiring is disposed on the bottom surface of the second recess 211b, and the internal terminal 242 and the relay substrate 4 are electrically coupled via the joining member B2. Further, the vibrating element 6 is positioned on the upper side of the relay substrate 4 and is coupled to the upper surface of the vibrating element mount 43 of the relay substrate 4 via the joining member B3. By adopting such a configuration, compared to the above-described first embodiment, a heat transfer path between the circuit element 3 and the vibrating element 6 becomes longer, and thus, the heat of the circuit element 3 is unlikely to be transmitted to the vibrating element 6. Therefore, the temperature change of the vibrating element 6 can be suppressed, and the variation in frequency characteristics can be effectively suppressed.

In this manner, in the embodiment, the base 21 has the first recess 211a and the second recess 211b that is open to the bottom surface of the first recess 211a, the circuit element 3 is coupled to the bottom surface of the first recess 211a, and the relay substrate 4 is coupled to the bottom surface of the second recess 211b. Accordingly, the heat transfer path between the circuit element 3 and the vibrating element 6 can be made relatively long, and the heat of the circuit element 3 becomes unlikely to be transmitted to the vibrating element 6. Therefore, the temperature change of the vibrating element 6 can be suppressed, and the variation in frequency characteristics can be effectively suppressed.

According to the fourth embodiment as described above, the same configurations as those of the above-described first embodiment can be achieved.

Fifth Embodiment

Figure 12:
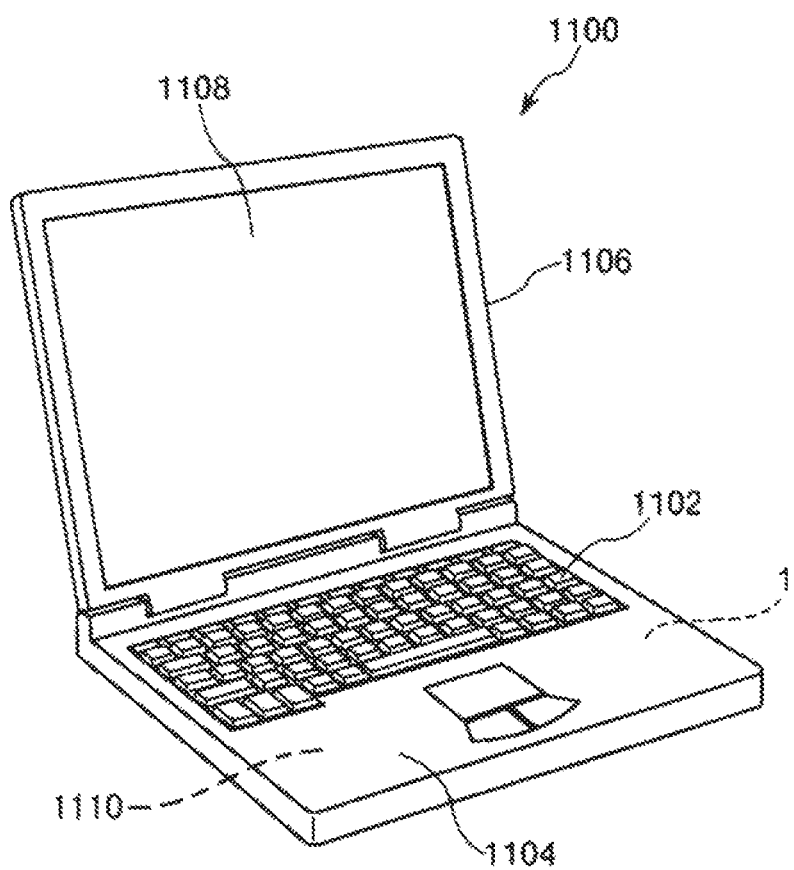
FIG. 12 is a perspective view illustrating a personal computer according to a fifth embodiment.

FIG. 12 is a perspective view illustrating a personal computer according to a fifth embodiment.

A personal computer 1100 as an electronic apparatus illustrated in FIG. 12 includes a main body portion 1104 provided with a keyboard 1102 and a display unit 1106 provided with a display portion 1108, and the display unit 1106 is supported to be rotatable through a hinge structure with respect to the main body portion 1104. In addition, the personal computer 1100 includes the vibrator device 1 as a physical quantity sensor and a signal processing circuit 1110 that performs signal processing, that is, controls each portion, based on an output signal from the vibrator device 1.

As described above, the personal computer 1100 as the electronic apparatus includes the vibrator device 1 and the signal processing circuit 1110 that performs signal processing based on the output signal of the vibrator device 1. Therefore, the effect of the above-described vibrator device 1 can be enjoyed and high reliability can be exhibited.

Sixth Embodiment

Figure 13:
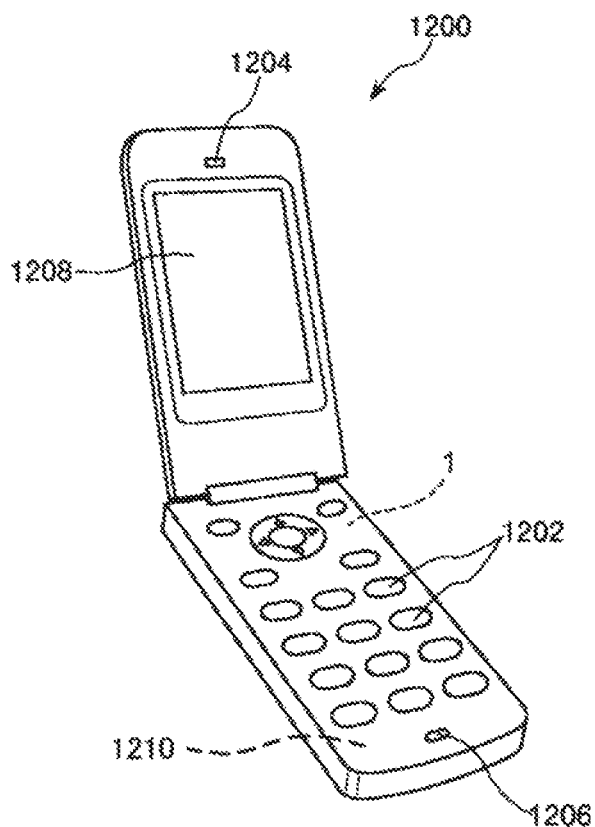
FIG. 13 is a perspective view illustrating a mobile phone according to a sixth embodiment.

FIG. 13 is a perspective view illustrating a mobile phone according to a sixth embodiment.

A mobile phone 1200 as an electronic apparatus illustrated in FIG. 13 includes an antenna (not illustrated), a plurality of operation buttons 1202, an earpiece 1204, and a mouthpiece 1206, and a display portion 1208 is disposed between the operation buttons 1202 and the earpiece 1204. In addition, the mobile phone 1200 includes the vibrator device 1 as a physical quantity sensor and a signal processing circuit 1210 that performs signal processing, that is, controls each portion, based on an output signal from the vibrator device 1.

In this manner, the mobile phone 1200 as the electronic apparatus includes the vibrator device 1 and the signal processing circuit 1210 that performs signal processing based on the output signal of the vibrator device 1. Therefore, the effect of the above-described vibrator device 1 can be enjoyed and high reliability can be exhibited.

Seventh Embodiment

Figure 14:
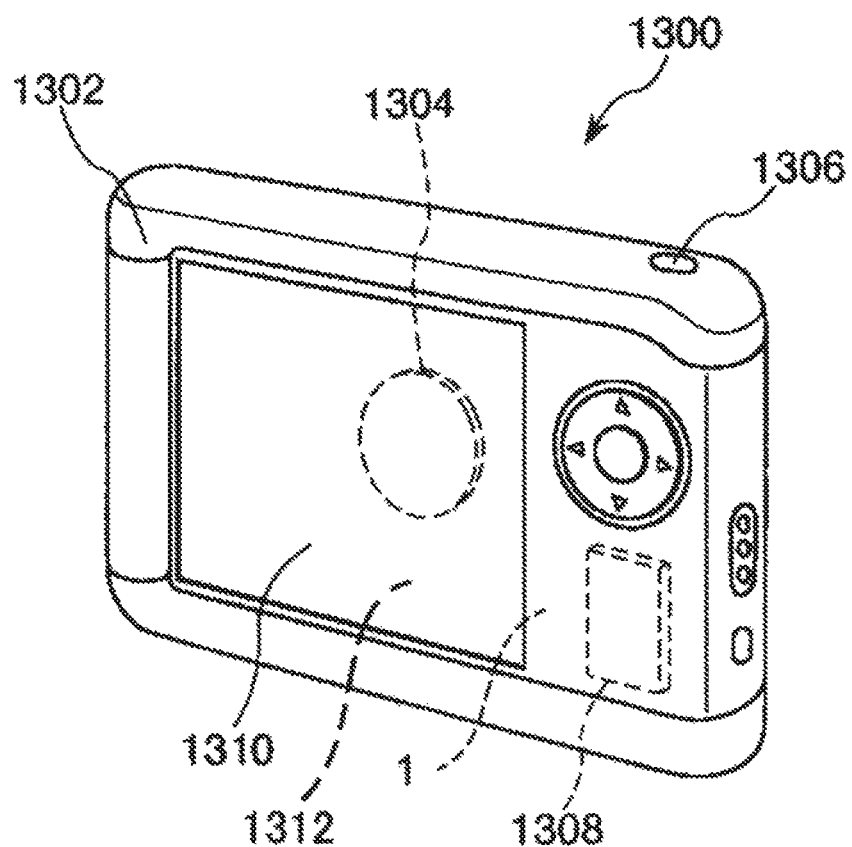
FIG. 14 is a perspective view illustrating a digital still camera according to a seventh embodiment.

FIG. 14 is a perspective view illustrating a digital still camera according to a seventh embodiment.

A digital still camera 1300 as an electronic apparatus illustrated in FIG. 14 includes a case 1302, and a display portion 1310 is provided on the back surface of the case 1302. The display portion 1310 is configured to perform display based on an imaging signal from a CCD, and functions as a finder that displays a subject as an electronic image. In addition, a light receiving unit 1304 including an optical lens or a CCD is provided on the front side of the case 1302. When a photographer confirms a subject image displayed on the display portion 1310 and presses a shutter button 1306, the imaging signal of the CCD at this time is transferred and stored in a memory 1308. In addition, the digital still camera 1300 includes the vibrator device 1 as a physical quantity sensor and a signal processing circuit 1312 that performs signal processing, that is, controls each portion, based on an output signal from the vibrator device 1.

In this manner, the digital still camera 1300 as the electronic apparatus includes the vibrator device 1 and the signal processing circuit 1312 that performs signal processing based on the output signal of the vibrator device 1. Therefore, the effect of the above-described vibrator device 1 can be enjoyed and high reliability can be exhibited.

In addition to the above-described personal computer 1100, the mobile phone 1200, and the digital still camera 1300, examples of the electronic apparatus including the vibrator device 1 may include smartphones, tablet terminals, timepieces including a smart watch, ink jet discharge devices, such as an ink jet printer, wearable terminals, such as a head-mounted display (HMD), TV, video cameras, video tape recorders, car navigation devices, pagers, electronic notebooks, electronic dictionaries, calculators, electronic game machines, word processors, workstations, videophones, security video monitors, electronic binoculars, POS terminals, medical devices, such as electronic thermometers, sphygmomanometers, blood glucose meters, electrocardiogram measuring devices, ultrasound diagnostic devices, an electronic endoscope, fish finders, various measurement devices, instruments, such as instruments for vehicles, aircraft, a ship, base stations for a mobile terminal, flight simulators, and the like.

Eighth Embodiment

Figure 15:
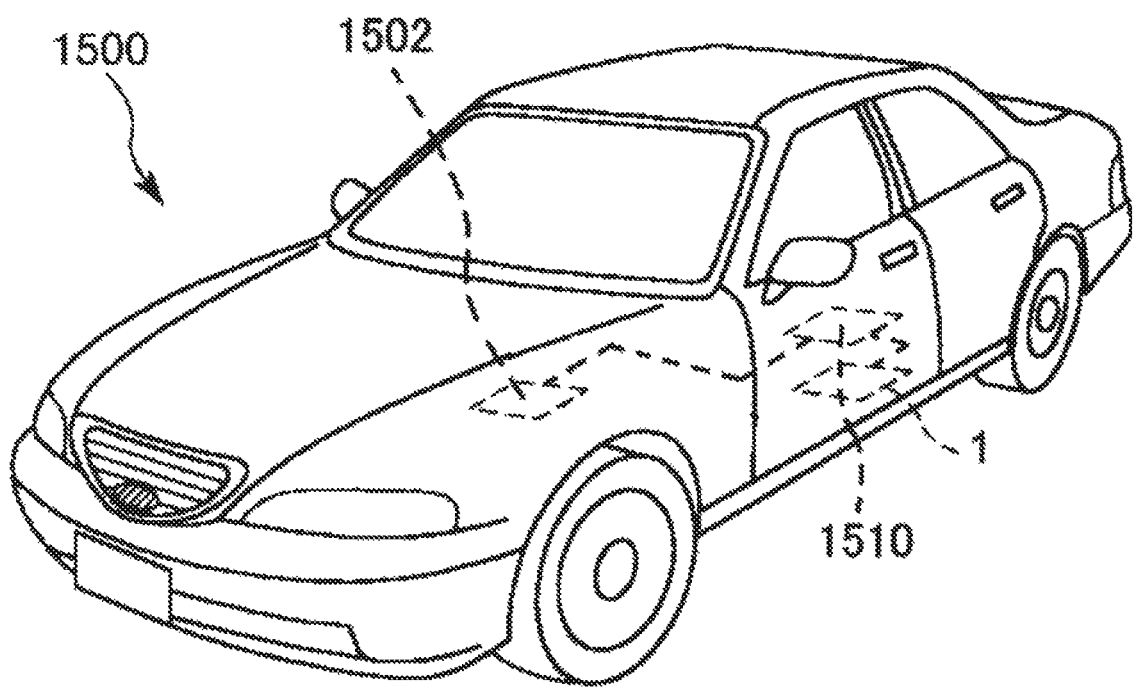
FIG. 15 is a perspective view illustrating an automobile according to an eighth embodiment.

FIG. 15 is a perspective view illustrating an automobile according to an eighth embodiment.

An automobile 1500 as a vehicle illustrated in FIG. 15 includes a system 1502, such as an engine system, a brake system, and a keyless entry system. In addition, the automobile 1500 includes a vibrator device 1 as a physical quantity sensor and a signal processing circuit 1510 that performs signal processing, that is, controls the system 1502, based on an output signal from the vibrator device 1.

In this manner, the automobile 1500 as the vehicle includes the vibrator device 1 and the signal processing circuit 1510 that performs signal processing based on the output signal (oscillation signal) of the vibrator device 1. Therefore, the effect of the above-described vibrator device 1 can be enjoyed and high reliability can be exhibited.

In addition, in addition to the automobile 1500, examples of the vehicle provided with the vibrator device 1 may include a robot, a drone, a two-wheeled vehicle, an aircraft, a ship, a train, a rocket, a spacecraft, and the like.

Above, the vibrator device, the electronic apparatus, and the vehicle according to the disclosure have been described based on the illustrated embodiments, but the disclosure is not limited thereto, and the configuration of each portion can be replaced with any configuration having similar functions. In addition, any configuration member may be added to the disclosure. Moreover, each embodiment may be appropriately combined with each other.

What is claimed is:

1. A vibrator device comprising:
   a base;
   a relay substrate supported by the base; and
   a vibrating element supported by the relay substrate, wherein
   the relay substrate includes a base mount that is directly or indirectly fixed to the base, a vibrating element mount on which the vibrating element is mounted, and a beam that couples the base mount and the vibrating element mount, and
   parts of the vibrating element mount that are coupled to the vibrating element are positioned at both sides of the base mount while interposing the base mount therebetween in a plan view.

2. The vibrator device according to claim 1, further comprising:
   a circuit element supported by the base and electrically coupled to the vibrating element.

3. The vibrator device according to claim 2, wherein
   the relay substrate is supported by the base via the circuit element.

4. The vibrator device according to claim 3, wherein
the base includes a first recess and a second recess that is open to a bottom surface of the first recess,
the circuit element is supported on the bottom surface of the first recess,
the relay substrate and the vibrating element are positioned between the circuit element and a bottom surface of the second recess, and
the circuit element is coupled to the bottom surface of the first recess and coupled to the relay substrate on a surface of the circuit element at the bottom surface side of the second recess.

5. The vibrator device according to claim 4, wherein
the circuit element is coupled to the bottom surface of the first recess at an outer periphery of the surface of the circuit element at the bottom surface side of the second recess, and is coupled to the relay substrate at a middle of the surface of the circuit element at the bottom surface side of the second recess.

6. The vibrator device according to claim 4, wherein
the relay substrate is positioned between the circuit element and the vibrating element.

7. The vibrator device according to claim 3, wherein
the circuit element has a first surface and a second surface that are in a front-rear relationship,
the first surface is coupled to the base, and
the second surface is coupled to the relay substrate.

8. The vibrator device according to claim 3, wherein
in a plan view of the relay substrate, the relay substrate is coupled to the circuit element in a region of the base mount that does not overlap the vibrating element.

9. The vibrator device according to claim 2, wherein
the base includes a first recess and a second recess that is open to a bottom surface of the first recess,
the circuit element is coupled to the bottom surface of the first recess, and
the relay substrate is coupled to a bottom surface of the second recess.

10. The vibrator device according to claim 1, wherein
the relay substrate is formed of a material which is the same as that of the vibrating element.

11. The vibrator device according to claim 1, wherein
in a plan view of the relay substrate,
the beam is positioned between the vibrating element mount and the base mount, and includes a frame that has a frame shape surrounding the vibrating element mount, a first beam that couples the base mount and the frame, and a second beam that couples the vibrating element mount and the frame, and
a central axis of the first beam and a central axis of the second beam intersect each other.

12. An electronic apparatus comprising:
the vibrator device according to claim 1; and
a signal processing circuit that performs signal processing based on an output signal of the vibrator device.

13. A vehicle comprising:
the vibrator device according to claim 1; and
a signal processing circuit that performs signal processing based on an output signal of the vibrator device.

* * * * *